(12) United States Patent
Zhang (10) Patent No.: US 10,880,728 B2
(45) Date of Patent: Dec. 29, 2020

(54) METHOD FOR DATA MIGRATION AND TERMINAL DEVICE

(71) Applicant: Guangdong Oppo Mobile Telecommunications Corp., Ltd., Guangdong (CN)

(72) Inventor: Hailong Zhang, Guangdong (CN)

(73) Assignee: GUANGDONG OPPO MOBILE TELECOMMUNCATIONS CORP., LTD., Dongguan (CN)

( * ) Notice: Subject to any disclaimer, the term of this patent is extended or adjusted under 35 U.S.C. 154(b) by 101 days.

(21) Appl. No.: 16/254,989

(22) Filed: Jan. 23, 2019

(65) Prior Publication Data

US 2019/0159020 A1 May 23, 2019

Related U.S. Application Data

(63) Continuation of application No. PCT/CN2017/092869, filed on Jul. 13, 2017.

(30) Foreign Application Priority Data

Sep. 14, 2016 (CN) .......................... 2016 1 0826549

(51) Int. Cl.
*H04W 8/24* (2009.01)
*G06F 9/455* (2018.01)
(Continued)

(52) U.S. Cl.
CPC .......... *H04W 8/24* (2013.01); *G06F 9/44505* (2013.01); *G06F 11/1464* (2013.01); *G06F 11/1469* (2013.01); *H04W 76/14* (2018.02)

(58) Field of Classification Search
CPC ............. G06F 11/1464; G06F 11/1469; G06F 9/44505; H04W 76/14; H04W 8/24
See application file for complete search history.

(56) References Cited

U.S. PATENT DOCUMENTS 8,879,396 B2 * 11/2014 Guay ...................... H04L 49/15
370/236
9,367,561 B1 6/2016 Dutch et al.
(Continued)

FOREIGN PATENT DOCUMENTS

| CN | 101105738 A | 1/2008 |
| CN | 102196591 A | 9/2011 |

(Continued)

OTHER PUBLICATIONS

International search report issued in corresponding international application No. PCT/CN2017/092869 dated Sep. 22, 2017.
(Continued)

*Primary Examiner* — Alina A Boutah (57) ABSTRACT

A method for data migration in a first terminal device is provided, which includes the following. Connect to a hotspot established by a second terminal device. A first data set is received from the second terminal device and data recovery on the first data set is performed in one thread. A second data set is received from the second terminal device and data recovery is performed on the second data set in another thread, during data recovery of the first data set.

17 Claims, 7 Drawing Sheets

(51) Int. Cl.
*G06F 11/14* (2006.01)
*H04W 76/14* (2018.01)
*G06F 9/445* (2018.01)

(56) References Cited

U.S. PATENT DOCUMENTS

| | | | | |
|---|---|---|---|---|
| 9,811,375 | B2* | 11/2017 | Zamir | G06F 9/4856 |
| 2005/0097356 | A1* | 5/2005 | Zilliacus | H04W 36/0066 |
| | | | | 726/4 |
| 2005/0131853 | A1 | 6/2005 | Sampath et al. | |
| 2009/0300283 | A1* | 12/2009 | Kudo | G06F 3/0689 |
| | | | | 711/114 |
| 2012/0117558 | A1 | 5/2012 | Futty et al. | |
| 2012/0185933 | A1* | 7/2012 | Belk | G06F 21/6218 |
| | | | | 726/17 |
| 2012/0260051 | A1* | 10/2012 | Maki | G06F 3/0685 |
| | | | | 711/162 |
| 2013/0246840 | A1* | 9/2013 | Kumano | G06F 11/1088 |
| | | | | 714/6.21 |
| 2013/0346572 | A1* | 12/2013 | Jain | G06F 9/5088 |
| | | | | 709/223 |
| 2014/0012913 | A1* | 1/2014 | Varoglu | H04W 4/50 |
| | | | | 709/204 |
| 2015/0009881 | A1 | 1/2015 | Yeh et al. | |
| 2015/0052282 | A1* | 2/2015 | Dong | H04L 49/70 |
| | | | | 710/308 |
| 2016/0004473 | A1* | 1/2016 | Chiu | G06F 3/0649 |
| | | | | 710/74 |
| 2016/0170791 | A1* | 6/2016 | Huh | G06F 9/5088 |
| | | | | 718/1 |
| 2016/0350292 | A1* | 12/2016 | Yu | G06F 16/214 |
| 2017/0019443 | A1* | 1/2017 | Conan | H04N 21/8186 |
| 2018/0054854 | A1* | 2/2018 | Liu | H04W 12/06 |
| 2019/0227930 | A1* | 7/2019 | Tu | G06F 3/0643 |

FOREIGN PATENT DOCUMENTS

| | | |
|---|---|---|
| CN | 103092694 A | 5/2013 |
| CN | 105282824 A | 1/2016 |
| CN | 105871423 A | 8/2016 |
| CN | 105912421 A | 8/2016 |
| CN | 106020959 A | 10/2016 |
| KR | 20090013972 A | 2/2009 |

OTHER PUBLICATIONS

Extended European search report issued in corresponding European application No. 17850106.0 dated Jun. 3, 2019.

* cited by examiner

METHOD FOR DATA MIGRATION AND TERMINAL DEVICE

CROSS-REFERENCE TO RELATED APPLICATION(S)

This application is a continuation of International Application No. PCT/CN2017/092869, filed on Jul. 13, 2017, which claims priority to Chinese Patent Application No. 201610826549.5, filed on Sep. 14, 2016, the disclosures of both of which are hereby incorporated by reference in their entireties.

TECHNICAL FIELD

This disclosure relates to the technical field of electronics, and particularly to a method for data migration and related devices.

BACKGROUND

At present, users change mobile phones more and more frequently. However, for people in lazy habits and green hands in cellphone technologies, changing a mobile phone means everything will start from an original state, and applications for daily use, important chat records, documents, all Wi-Fi passwords stored, and even some usage habits in the old mobile phone will be lost. Every time the user charges the mobile phone, the user is happy for minutes and troublesome for hours.

In order to solve the above-mentioned problem, data migration is provided. Data migration refers to a process in which data backup is performed by the old mobile phone and then the backup data is transmitted to the new mobile phone for data recovery to achieve the purpose of replacing the old mobile phone with a new mobile phone. The duration required for data recovery affects data migration efficiency, and therefore, how to shorten the duration required for data recovery in data migration is a technical problem to be solved in the field.

SUMMARY

According to a first aspect of the present disclosure, a method for data migration in a first terminal device is provided. The method includes the following. Connect to a hotspot established by a second terminal device. A first data set is received from the second terminal device and data recovery on the first data set is performed in one thread. A second data set is received from the second terminal device and data recovery is performed on the second data set in another thread, during data recovery of the first data set.

According to a second aspect of the present disclosure, a method for data migration in a second terminal device is provided. A hotspot is established. A first data set is transmitted to a first terminal device, after the first terminal device is connected to the hotspot. A second data set is transmitted to the first terminal device, after transmission of the first data set is completed.

According to a third aspect of the present disclosure, a terminal device is provided. The terminal device includes at least one processor and a computer readable storage. The computer readable storage is coupled to the at least one processor and stores at least one computer executable instruction thereon which, when executed by the at least one processor, causes the at least one processor to carry out actions, including: connecting to a hotspot established by another terminal device; receiving a first data set from the another terminal device and performing data recovery on the first data set in one thread; receiving a second data set from the another terminal device and performing data recovery on the second data set in another thread, during data recovery of the first data set.

BRIEF DESCRIPTION OF DRAWINGS

To illustrate the technical solutions embodied by the implementations of the present disclosure more clearly, the following briefly introduces the accompanying drawings required for describing the implementations or the related art. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Technical solutions in the implementations of the present disclosure will be described clearly and completely hereinafter with reference to the accompanying drawings in the implementations of the present disclosure for those skilled in the art to better understand the scheme of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The following will describe in detail the implementations of the present disclosure.

The terms "first", "second", "third", and "fourth" used in the specification, the claims, and the accompanying drawings of the present disclosure are used for distinguishing between different objects rather than describing a particular order. The terms "include", "comprise", and "have" as well as variations thereof are intended to cover non-exclusive inclusion. For example, a process, method, system, product, device, or apparatus including a series of steps or units is not limited to the listed steps or units, it can optionally include other steps or units that are not listed; alternatively, other steps or units inherent to the process, method, product, device, or apparatus can be included either.

The term "implementation" referred to herein means that a particular feature, structure, or characteristic described in conjunction with the implementation may be contained in at least one implementation of the present disclosure. The term appearing in various places in the specification does not necessarily refer to the same implementation, nor does it refer to an independent or alternative implementation that is mutually exclusive with other implementations. It is explicitly and implicitly understood by those skilled in the art that an implementation described herein may be combined with other implementations.

Hereinafter, some terms of the present disclosure will be explained and interpreted to facilitate understanding by those skilled in the art.

"Terminal device", also known as user equipment (UE), is a device that provides voice and/or data connectivity for a user, for example, handheld devices having wireless connection functions, in-vehicle devices, and the like. Common terminal device includes, for example, mobile phones, tablets, laptops, palmtops, mobile internet devices (MID), wearable devices such as smart watches, smart bracelets, pedometers, and the like.

"Hotspot" is established by converting GPRS, 3G, 4G or 5G signals received by a terminal device into Wi-Fi signals and then sending the Wi-Fi signals out. In this way, the terminal device can act as a Wi-Fi hotspot. A wireless access point function is required for a terminal device to establish a hotspot.

"Data set", also known as an information set, a data collection, or an information collection, is a set composed of data.

"Thread", also known as lightweight process (LWP), is a minimum unit of program execution flow.

"Serial execution" refers to a situation where operation A and operation B are successively executed, for example, operation A is executed before operation B, or operation A is executed after operation B.

"Parallel execution" refers to a situation where operation A and operation B are executed in two threads respectively. For example, operation A is executed in a first thread while operation B is executed in a second thread, and operation A and operation B can be executed concurrently. Alternatively, one operation can be executed during execution of another operation.

"Multiple" means two or more. "And/or" describes a relationship of associated objects, and means that there may be three kinds of relationships, for example, "A and/or B" may indicate that A exists alone, A and B exist simultaneously, and B exists alone. The character "/" generally indicates that the associated objects is in an "or" relationship.

Implementations of the present disclosure will be described hereinafter with reference to the accompanying drawings.

Figure 1:
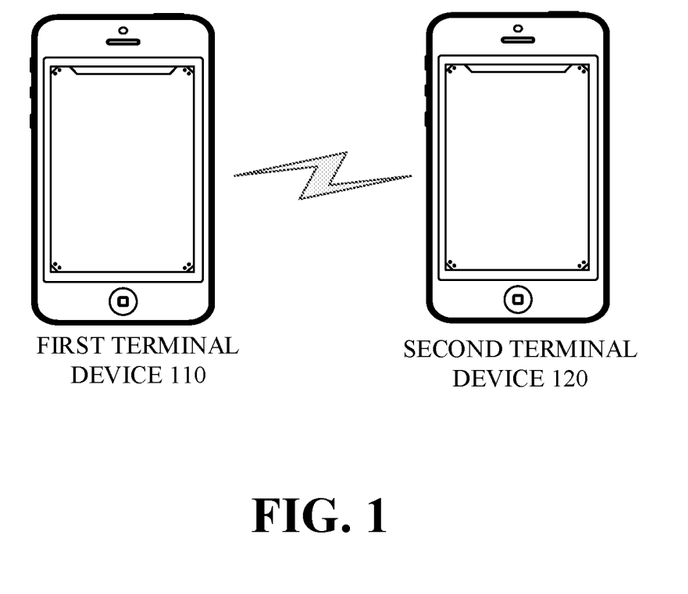
FIG. 1 is a schematic diagram illustrating a communication system according to an implementation of the present disclosure.

FIG. 1 is a schematic diagram illustrating a communication system according to an implementation of the present disclosure. The communication system illustrated in FIG. 1 includes a first terminal device 110 and a second terminal device 120. A hotspot is established by the second terminal device 120. The first terminal device 110 is configured to be connected to the hotspot established by the second terminal device 120. The second terminal device 120 is configured to transmit a first data set to the first terminal device 110. The first terminal device 110 is configured to receive the first data set and perform data recovery on the first data set received. After transmission of the first data set is completed, the second terminal device 120 is configured to transmit a second data set to the first terminal device 110. The first terminal device 110 is configured to receive the second data set from the second terminal device 120. During data recovery of the first data set, when reception of the second data set is completed, the first terminal device 110 is configured to perform data recovery on the second data set. It can be seen that, the first terminal device 110 is configured to perform data recoveries in parallel, such that the time required for data recovery and the time required for data migration can be reduced.

Figure 2:
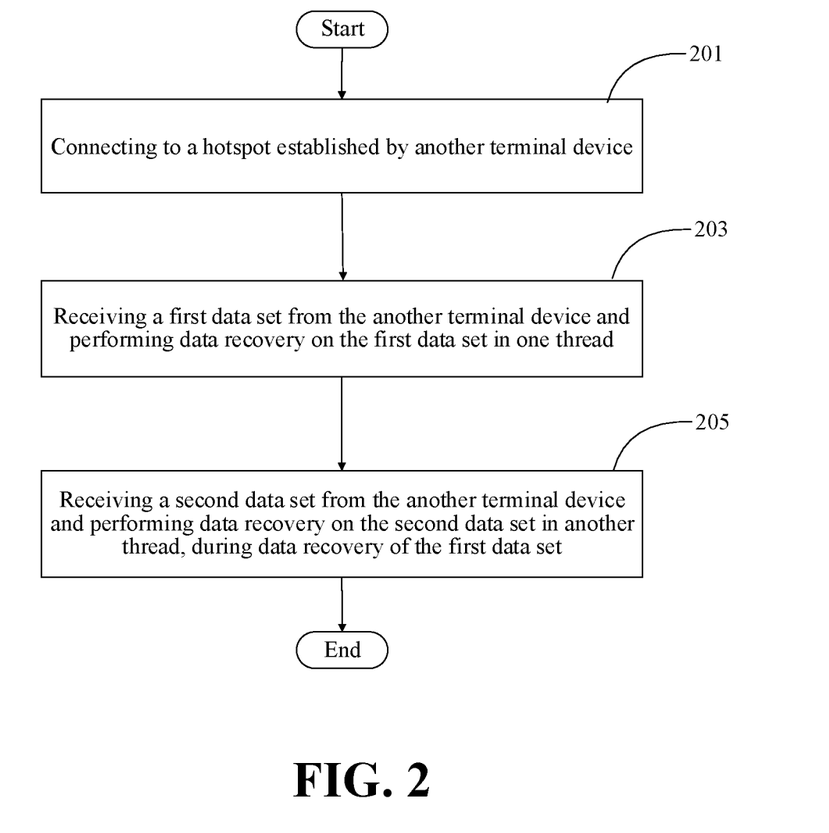
FIG. 2 is a schematic flow chart illustrating a method for data migration according to a first implementation of the present disclosure.

FIG. 2 is a schematic flow chart illustrating a method for data migration according to an implementation of the present disclosure. The method is applicable to a terminal device such as the first terminal device 110 illustrated in FIG. 1. As illustrated in FIG. 2, the method begins at block 201.

At block 201, the first terminal device connects to a hotspot established by another terminal device, for example, the second terminal device 120 illustrated in FIG. 1.

At block 203, the first terminal device receives a first data set from the another terminal device and perform data recovery on the first data set in one thread.

At block 205, the first terminal device receives a second data set from the another terminal device and performs data recovery on the second data set in another thread, during data recovery of the first data set.

As can be seen, data recovery of the first data set and data recovery of the second data set are performed in parallel and therefore, time required for data migration from one terminal device (for example, the second terminal device) to another terminal device (for example, the first terminal device) can be reduced.

Figure 3:
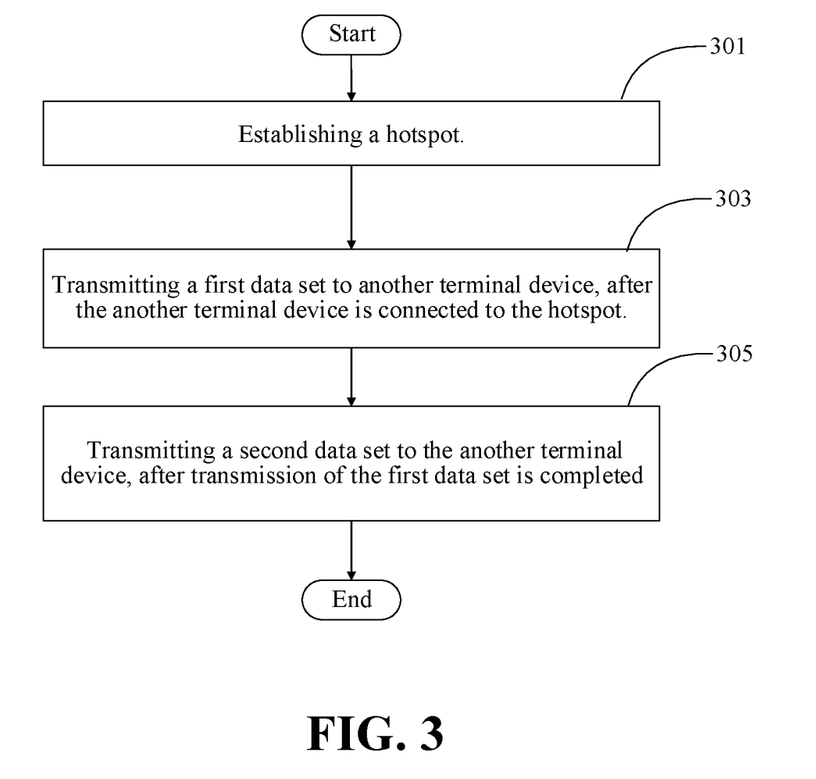
FIG. 3 is a schematic flow chart illustrating a method for data migration according to a first implementation of the present disclosure.

FIG. 3 is a schematic flow chart illustrating a method for data migration according to an implementation of the present disclosure. The method is applicable to a terminal device such as the terminal device 120 illustrated in FIG. 1. As illustrated in FIG. 2, the method begins at block 301.

At block 301, the second terminal device establish a hotspot.

At block 303, the second terminal device transmits a first data set to another terminal device, such as the first terminal device 110 illustrated in FIG. 1, after the another terminal device is connected to the hotspot.

At block 305, the second terminal device transmits a second data set to the another terminal device, after transmission of the first data set is completed.

Figure 4:
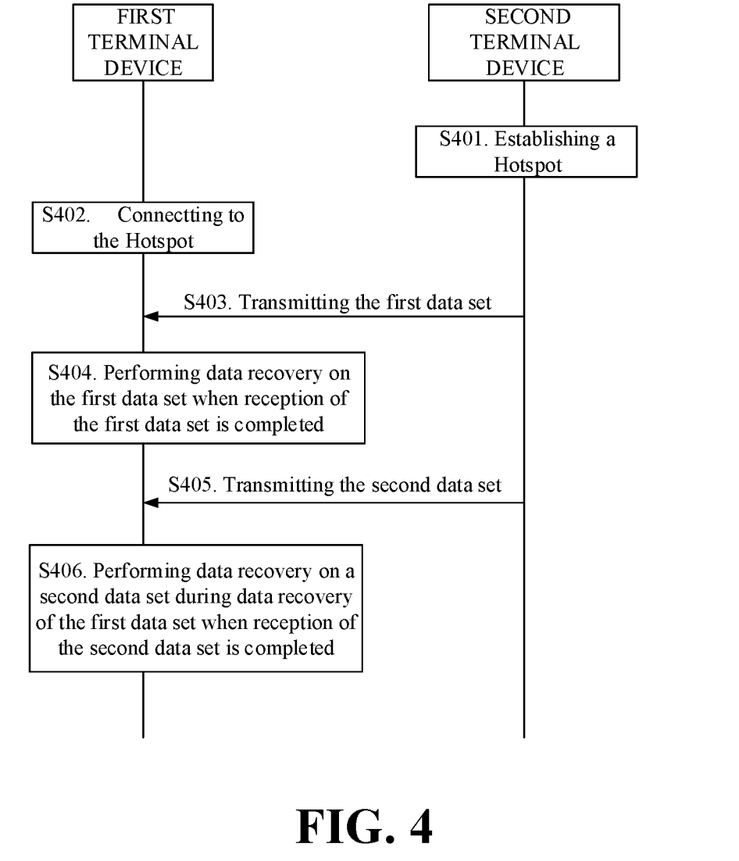
FIG. 4 is a schematic flow chart illustrating a method for data migration according to a first implementation of the present disclosure.

FIG. 4 is a schematic flow chart illustrating a method for data migration according to an implementation of the present disclosure. The method can be implemented in the communication system illustrated in FIG. 1. The method for data migration begins at block 401.

At block 401, the second terminal device establishes the hotspot.

At block 402, the first terminal device is connected to the hotspot.

At block 403, the second terminal device transmits the first data set to the first terminal device.

At block 404, the first terminal device receives the first data set from the second terminal device 120. After reception of the first data set transmitted by the second terminal device is completed, the first terminal device performs data recovery on the first data set.

At block 405, after transmission of the first data set is completed, the second terminal device transmits the second data set to the first terminal device.

At block 406, the first terminal device receives the second data set from the second terminal device. During data recovery of the first data set, after reception of the second data set transmitted by the second terminal device is completed, the first terminal device performs data recovery on the second data set.

As an implementation, when an operation for starting transmission of related software is received at the second terminal device, the second terminal device establishes the hotspot. The first terminal device is connected to the hotspot, and the second terminal device transmits the first data set to the first terminal device. After reception of the first data set is completed, the first terminal device performs data recovery directly on the first data set. During data recovery of the first data set, the second terminal device transmits the second data set to the first terminal device, and the first terminal device receives the second data set from the second terminal device. During data recovery of the first data set, if reception of the second data set is completed, the first terminal device performs data recovery on the second data set in another thread. According to the above-mentioned scheme, data recoveries are performed in parallel, such that the time required for data recovery and the time required for data migration can be reduced.

As an implementation, data recovery on any data set (for example, the first data set, the second data set, and other data sets which not detailed herein) is performed when the number of threads for data recoveries currently running in parallel is less than or equal to a first threshold.

To this end, prior to operations at block 404, the first terminal device may first determine whether the number of threads for data recoveries currently running in parallel is less than or equal to a first threshold, and proceed to data recovery at block 404 when the number of threads for data recoveries currently running in parallel is less than or equal to the first threshold.

Similarly, prior to operations at block 406, the first terminal device may first determine whether the number of threads for data recoveries currently running in parallel is less than or equal to a first threshold, and proceed to data recovery at block 406 when the number of threads for data recoveries currently running in parallel is less than or equal to the first threshold.

The first threshold can be two, four, five, six, eight, or other values.

In one implementation, the first threshold is five for example. Generally, when multiple threads are running on a device concurrently, the device is prone to be stuck, thereby affecting the normal operation of the device. In order to guarantee that the device can still operate normally while the time required for data recovery is reduced, before conducting data recovery, it is necessary for the first terminal device to determine whether the number of threads for data recoveries currently running in parallel is greater than five. If the number of threads for data recoveries currently running in parallel is greater than five, the first terminal device has to wait until a certain thread is completed. On the other hand, if the number of threads for data recoveries currently running in parallel is less than or equal to five, the first terminal device can perform data recovery directly.

In one implementation, the first terminal device can perform data recovery on a data set as follows. The data set referred to herein can be the first data set, the second data set, or other similar data sets. When the data set has a size greater than or equal to a second threshold, the first terminal device divides the data set into multiple data subsets and performs data recovery on the multiple data subsets in one thread in serial. When the data set has a size less than the second threshold, the first terminal device performs data recovery on the data set without dividing. For the data recovery on the first data set, when the first data set has a size greater than or equal to a second threshold, the first terminal device divides the first data set into multiple data subsets and performs data recovery on the multiple data subsets in one thread in serial. Similarly, for the data recovery on the second data set, when the second data set has a size greater than or equal to a second threshold, the first terminal device divides the second data set into multiple data subsets and performs data recovery on the multiple data subsets in one thread in serial.

The second threshold can be 200 mb, 300 mb, 350 mb, 360 mb, or other values.

In one implementation, the second threshold is 200 mb for example. In order to avoid the device being stuck during data recovery due to excessive data set, it is necessary for the first terminal device to determine whether the data set has a size greater than or equal to 200 mb before performing data recovery. If the data set has a size greater than or equal to 200 mb, the data set will be divided into multiple data subsets, and then data recovery will be performed on the multiple data subsets in one thread in serial. Assuming that the multiple data subsets include a first data subset, a second data subset, and a third data subset, data recovery on the three data subsets can be performed in one thread in serial. For example, in one thread, data recovery on the first data subset can be performed first, and then data recovery on the second data subset can be performed after data recovery on the first data subset is completed, and so on.

As an implementation, the first terminal device can divide the data set into the multiple data subsets as follows. The first terminal device divides the data set into the multiple data subsets randomly. Alternatively, the first terminal device divides the data set into the multiple data subsets according to a preset rule. The preset rule may include at least one of: a difference in size (in the following, "size difference" for short) of adjacent data subsets being a third threshold, a size difference between any two of the multiple data subsets being less than or equal to a fourth threshold, and a size difference between the adjacent data subsets being a multiple of a fifth threshold.

As an implementation, before transmitting the first data set to the first terminal device, the second terminal device performs data backup on multiple applications in the second terminal device in parallel to obtain multiple data sets, with one data set corresponds to one application, that is, the multiple data sets are in one-to-one correspondence with the multiple applications.

As an implementation, backup of the first data set is completed earlier than backup of the second data set. A size of the first data set is smaller than that of the second data set. A usage frequency of an application corresponding to the first data set is higher than that of an application corresponding to the second data set. Size of a data set may refer to the number of elements contained in the data set for example. The usage frequency of an application refers to the number of times of the application within a certain time period.

As an implementation, the multiple applications are defined by the second terminal device, or specified by the first terminal device.

Before data migration, the second terminal device can display a data interface, on which the user can check multiple applications whose data need to be transmitted to the first terminal device, in this case, the multiple applications are defined by the user. Alternatively, when the first terminal device is connected to the hotspot established by the second terminal device, the first terminal device detects applications that have been installed in a system thereof and specifies data related to the installed applications to be transmitted by the second terminal device to the first terminal device.

It should be noted that, since the second terminal device performs data backup on the multiple applications in parallel, the second terminal device can first transmit a data set of a certain application when data backup of this application has been completed; alternatively, the second terminal device can transmit data only after data backup for all of the multiple applications has been completed, which is not limited herein.

Figure 5:
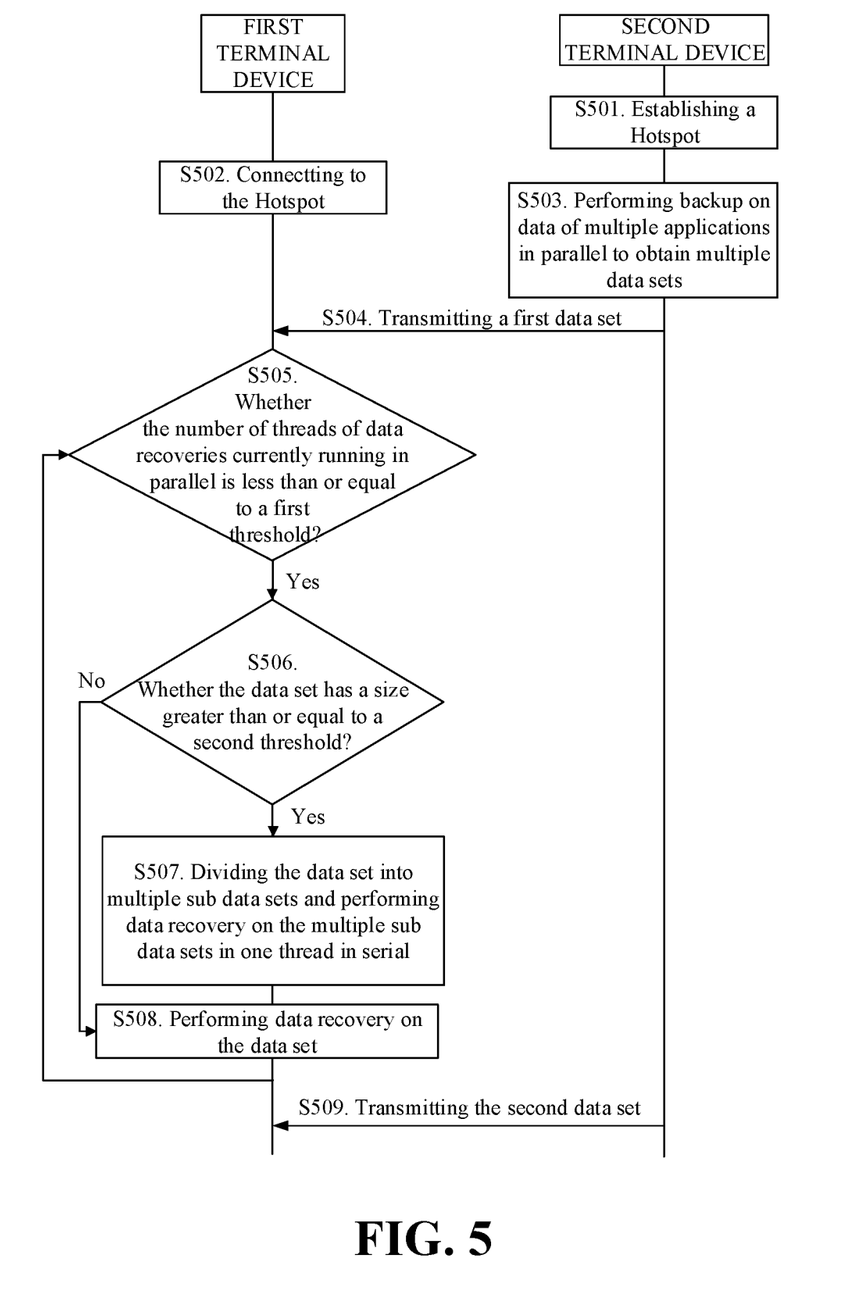
FIG. 5 is a schematic flow chart illustrating a method for data migration according to a second implementation of the present disclosure.

A more detailed method is provided in FIG. 5. As illustrated in FIG. 5, the method begins at block 501.

At block 501, a second terminal device establishes a hotspot.

At block 502, the first terminal device is connected to the hotspot established by the second terminal device.

At block 503, the second terminal device performs data backup on multiple applications in the second terminal device in parallel to obtain multiple data sets, with one data set corresponds to one application, that is, the multiple data sets are in one-to-one correspondence with the multiple applications.

At block 504, the second terminal device transmits a first data set to the first terminal device.

At block 505, the first terminal device receives the first data set from the second terminal device and determines whether the number of threads for data recoveries currently running in parallel is less than or equal to a first threshold.

When the number of threads for data recoveries currently running in parallel is less than or equal to the first threshold, proceed to block 506.

Otherwise, wait until a thread is completed and proceed to block 506.

At block 506, the first terminal device determines whether the data set has a size greater than or equal to a second threshold.

When the data set has a size greater than or equal to the second threshold, proceed to block 507. Otherwise, proceed to block 508.

At block 507, the first terminal device divides the data set into multiple data subsets and performs data recovery on the multiple data subsets in one thread in serial.

At block 508, the first terminal device performs data recovery on the data set.

At block 509, after data transmission of the first data set has been completed, the second terminal device transmits a second data set to the first terminal device.

The first terminal device receives the second data set from the second terminal device, and the first terminal device determines whether the number of threads for data recoveries currently running in parallel is less than or equal to the first threshold. That is, when the first terminal device receives the second data set, return to block 505 to carry out the operation of determining whether the number of threads for data recoveries currently running in parallel.

It should be noted that, for specific implementations of steps of the method illustrated in FIG. 5, reference can be made to the description of the above-mentioned method illustrated in FIG. 2 and FIG. 4, which is not repeated herein.

Figure 6:
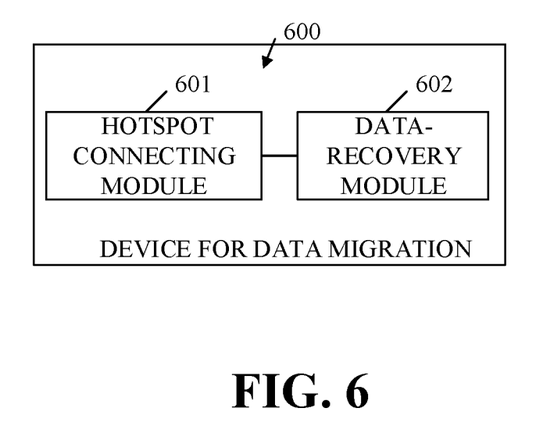
FIG. 6 is a schematic structural diagram illustrating a device for data migration according to a first implementation of the present disclosure.

As illustrated in FIG. 6, a device 600 for data migration is provided. The device 600 for data migration is deployed in a terminal device such as the first terminal device 110 illustrated in FIG. 1 and includes a hotspot connecting module 601 and a data-recovery module 602.

The hotspot connecting module 601 is configured to connect to a hotspot established by a second terminal device.

The data-recovery module 602 is configured to perform data recovery on a first data set when the first terminal device completes reception of the first data set transmitted by the second terminal device, and further configured to perform data recovery on a second data set during data recovery of the first data set when the first terminal device completes reception of the second data set transmitted by the second terminal device.

As one implementation, the data-recovery module 602 is configured to perform data recovery on a data set when the number of threads for data recoveries currently running in parallel is less than or equal to a first threshold.

As one implementation, the data-recovery module 602 is configured to divide the data set into multiple data subsets and perform data recovery on the multiple data subsets in one thread in serial when the data set has a size greater than or equal to a second threshold, and to perform data recovery on the data set when the data set has a size less than the second threshold.

As one implementation, the first data set and the second data set are in one of the following relationships: backup of the first data set is completed earlier than backup of the second data set; a size of the first data set is less than that of the second data set; a usage frequency of an application corresponding to the first data set is higher than that of an application corresponding to the second data set.

It should be noted that the above-mentioned modules (the hotspot connecting module 601 and the data-recovery module 602) are configured to execute corresponding operations of the illustrated in FIG. 2 and FIG. 4-FIG. 5.

In implementations of the present disclosure, the device 600 for data migration is presented in the form of modules. "Module" used herein may refer to an application-specific integrated circuit (ASIC), a processor and a memory that can execute one or more software or firmware programs, an integrated logic circuit, and/or other components that can achieve the above-described functions. In addition, the hotspot connecting module 601 and the data-recovery module 602 can be implemented by a processor 801 of a terminal device 800 illustrated in FIG. 8.

Figure 7:
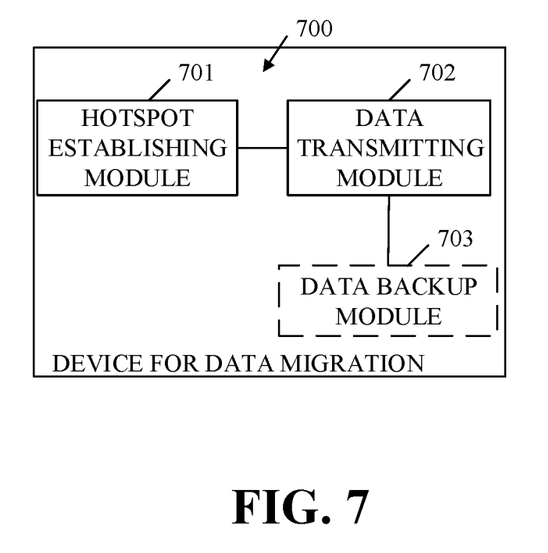
FIG. 7 is a schematic structural diagram illustrating a device for data migration according to a second implementation of the present disclosure.

As illustrated in FIG. 7, a device 700 for data migration is further provided. The device 700 for data migration is deployed in a terminal device such as the second terminal device 120 illustrated in FIG. 1 and includes a hotspot establishing module 701 and a data transmitting module 702.

The hotspot establishing module 701 is configured to establish a hotspot.

The data transmitting module 702 is configured to transmit a first data set to a first terminal device after the first terminal 110 device is connected to the hotspot, and further configured to transmit a second data set to the first terminal device after transmission of the first data set is completed.

As one implementation, the device 700 for data migration further includes a data backup module 703.

The data backup module 703 is configured to perform data backup on multiple applications in the second terminal device in parallel to obtain multiple data sets with one data set corresponds to one application.

As one implementation, the first data set and the second data set are in one of the following relationships: backup of the first data set is completed earlier than backup of the second data set; a size of the first data set is less than that of the second data set; a usage frequency of an application corresponding to the first data set is higher than that of an application corresponding to the second data set.

As one implementation, the multiple applications are defined by the second terminal device, or specified by the first terminal device.

It should be noted that the above-mentioned modules (the hotspot establishing module 701, the data transmitting module 702, and the data backup module 703) are configured to execute corresponding operations of the methods illustrated in FIG. 3-FIG. 5.

In implementations of the present disclosure, the device 700 for data migration is presented in the form of modules. "Module" used herein may refer to an application-specific integrated circuit (ASIC), a processor and a memory that can execute one or more software or firmware programs, an integrated logic circuit, and/or other components that can achieve the above-described functions. In addition, the hotspot establishing module 701, the data transmitting module 702, and the data backup module 703 can be implemented by the processor 801 of the terminal device 800 illustrated in FIG. 8.

Figure 8:
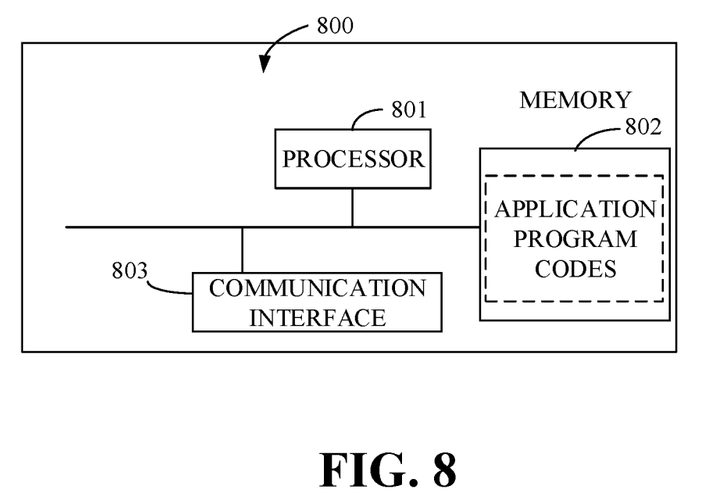
FIG. 8 is a schematic structural diagram illustrating a terminal device according to a third implementation of the present disclosure.

As illustrated in FIG. 8, the terminal device 600 and the terminal device 700 may be implemented with the structure illustrated in FIG. 8, and the terminal device 800 includes at least one processor 801, at least one memory 802, and at least one communication interface 803. The processor 801, the memory 802, and the communication interface 803 are connected and communicate with each other through a communication bus.

The processor 801 can be a general-purpose central processing module (CPU), a microprocessor, an application-specific integrated circuit (ASIC), or one or more integrated circuits for controlling execution of programs of the above schemes.

The communication interface 803 is configured to communicate with other devices or communication networks, such as an Ethernet, a radio access network (RAN), a wireless local area network (WLAN), and the like.

The memory 802 may be a read-only memory (ROM) or other types of static storage devices that can store static information and instructions, a random access memory (RAM) or other types of dynamic storage devices that can store information and instructions, or an electrically erasable programmable read-only memory (EEPROM), a compact disc read-only memory (CD-ROM), or other optical disk storage, optical disk storage (including compact discs, laser discs, optical discs, digital versatile discs, blue-ray discs, etc.), magnetic disk storage medium, other magnetic storage devices, or any other mediums that can be used to carry or store desired program codes in the form of instructions or data structures and can be accessed by a computer. The present disclosure is not limited thereto. The memory can be separated from the processor and connected to the processor via a bus. The memory can also be integrated with the processor.

The memory 802 is configured to store application program codes for executing the above schemes. The processor 801 is configured to execute the application program codes stored in the memory 802.

In one implementation, the terminal device 800 is the first terminal device, and the application program codes stored in the memory 802 can be invoked to execute the above-mentioned method for data migration performed by the terminal device 600. For example, connect to the hotspot established by the second terminal device. Perform data recovery on a first data set when the first terminal device completes reception of the first data set transmitted by the second terminal device. Perform data recovery on a second data set during data recovery of the first data set when the first terminal device completes reception of the second data set transmitted by the second terminal device.

In one implementation, the terminal device 800 is the second terminal device, the application program codes stored in the memory 802 can be invoked to execute the above-mentioned method for data migration performed by the terminal device 700. For example, establish a hotspot, transmit a first data set to a first terminal device after the first terminal device is connected to the hotspot, and transmit a second data set to the first terminal device after the second terminal device completes transmission of the first data set.

A more specific application scenario is given below, where the above-mentioned terminal devices are mobile phones, and components of the mobile phone will be described in detail with reference to FIG. 9 as follows. The architecture 900 illustrated in FIG. 9 includes a RF circuit 910, a memory 920, an input unit 930, a display unit 940, a sensor 950, an audio circuit 960, a Wi-Fi module 970, a processor 980, a power supply 990. The audio circuit 960 includes a speaker 961 and a microphone 962. The input unit 930 includes a touch panel 931 and other input devices 932.

The RF circuit 910 can be configured to receive and transmit signals during information transmission or reception or during a call. In some possible implementations, the RF circuit 910 is configured to receive downlink information from a base-station and passes the downlink information to a processor 980 for processing; in addition, the RF circuit 910 is configured to send uplink data to the base-station. Generally, the RF circuit 910 includes but is not limited to an antenna, at least one amplifier, a transceiver, a coupler, a low noise amplifier (LNA), a duplexer, and the like. Furthermore, the RF circuit 910 may also be configured to communicate with the network and other devices via wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The memory 920 is configured to store software programs and modules. The processor 980 is configured to execute various function applications and data processing of the mobile phone by running the software programs and the modules stored in the memory 920. The memory 920 can mainly include a program storage area and a data storage area. The program storage area can store an operating system, applications (such as data backup/recovery function, and data set transmitting/receiving function) required for at least one function, and so on. The data storage area can store data (such as a data set obtained by data backup, or a data set received from a terminal device on a transmitting side) created according to use of the mobile phone, and so on. In addition, the memory 920 can include a high-speed RAM, and can further include a non-volatile memory such as at least one disk storage device, a flash device, or other non-volatile solid storage devices.

The input unit 930 is configured to receive input digital or character information and generate key signal input associated with user setting and functional control of the mobile phone. In some possible implementations, the input unit 930 may include a touch panel 931 and other input devices 932. The touch panel 931, also referred to as a touch display screen, can be configured to receive a touch operation of the user on or near the touch panel 931 (such as an operation of the user on or near the touch panel 931 with fingers, stylus, or any other suitable objects or attachments) and drive a corresponding connection device based on a pre-set procedure. In some possible implementations, the touch panel 931 can include a touch detecting device and a touch controller. The touch detecting device can be configured to detect a touch position of the user, detect a signal generated by the touch operation, and send the signal to the touch controller. The touch controller is configured to receive touch information from the touch detecting device, convert the touch information into touch coordinate information and send the touch coordinate information to the processor 980, and receive and execute a command from the processor 980. In addition, the touch panel 931 can be of a capacitance-type, infrared ray-type, surface acoustic wave (SAW)-type, and other types. The input unit 930 can further include other input devices 932 in addition to the touch panel 931. Specifically, the other input devices 932 can include, but are not limited to, one or more of a physical keyboard, a functional key (such as a volume control key, a switch key, etc.), a track ball, a mouse, and an operating rod.

The display unit 940 is configured to display information input by the user, information provided for the user, or various menus of the mobile phone. The display unit 940 can include a display panel 941, and in some possible implementations, the display panel 941 may be configured in the form of a liquid crystal display (LCD), an organic light-emitting diode (OLED), and so on. In addition, the touch panel 931 can cover the display panel 941. After the touch panel 931 detects the touch operation on or near the touch panel 931 and sends the touch operation to the processor 980 to determine a type of a touch event, the processor 980 provides a corresponding visual output on the display panel 941 according to the type of the touch event. In FIG. 9, although the touch panel 931 and the display panel 941 are served as two independent components to realize input and output functions, the touch panel 931 may be integrated with the display panel 941 to realize the input and output functions in some possible implementations.

The mobile phone may also include at least one sensor 950, such as a light sensor, a motion sensor, and other sensors. As one implementation, the light sensor may include an ambient light sensor and a proximity sensor. The ambient light sensor can be configured to adjust the brightness of the display panel 941 according to ambient lights. The proximity sensor can be configured to turn off the display panel 941 and/or backlight when the mobile phone reaches nearby the ear. As one kind of motion sensor, an accelerometer sensor can be configured to detect the magnitude of acceleration in different directions (typically three axes) and the accelerometer sensor can also be configured to detect the magnitude and direction of gravity when the mobile phone is stationary. The accelerometer sensor can also be configured to identify mobile-phone gestures related applications (such as vertical and horizontal screen switch, related games, magnetometer attitude calibration) and can be used for vibration-recognition related functions (such as a pedometer, or percussion), and so on. The mobile phone can also be equipped with other sensors such as a gyroscope, a barometer, a hygrometer, a thermometer, an infrared sensor, etc., which will not be repeated herein.

The audio circuit 960, the speaker 961, and the microphone 962 can provide an audio interface between the user and the mobile phone. The audio circuit 960 can be configured to convert received audio data into electrical signals and transfer the electrical signals to the speaker 961; the speaker 961 is configured to convert the electrical signals received into sound signals for output. On the other hand, the microphone 962 is configured to convert the received sound signals into electrical signals, which will be received and then converted into audio data by the audio circuit 960. The audio data is then transmitted to the processor 980 to be processed. The audio data processed by the processor 980 is transmitted to another mobile phone via an RF circuit 910 for example or is output to the memory 920 for further processing.

Wi-Fi belongs to a short-range wireless transmission technology. With aid of a Wi-Fi module 970, the mobile phone may assist the user in E-mail receiving and sending, webpage browsing, access to streaming media, and the like. Wi-Fi provides users with wireless broadband Internet access. Although the Wi-Fi module 970 is illustrated in FIG. 9, it should be understood that the Wi-Fi module 970 is not essential to the mobile phone and can be omitted according to actual needs without departing from the essential nature of the present disclosure.

The processor 980 is a control center of the mobile phone, and is configured to connect all parts of the whole mobile phone by utilizing various interfaces and lines, to run or execute the software programs and/or the modules stored in the memory 920, and call data stored in the memory 920 to execute various functions and processing data of the mobile phone, so as to monitor the mobile phone as a whole. Optionally, in some implementations, the processor 980 can include one or more processing units. In some possible implementations, the processor 980 may be integrated with an application processor and a modulation-demodulation processor, the application processor mainly processes an operating system, a user interface, an application program, and the like, and the modulation-demodulation processor mainly processes wireless communication. It can be understood that the modulation-demodulation processor may not be integrated into the processor 980.

The mobile phone also includes a power supply 990 (e.g., a battery) that supplies power to various components. For instance, the power supply 990 may be logically connected to the processor 980 via a power management system to achieve management of charging, discharging, and power consumption through the power management system.

Although not illustrated, the mobile phone may include a camera, a Bluetooth® module, etc., and the disclosure will not elaborate herein.

Figure 9:
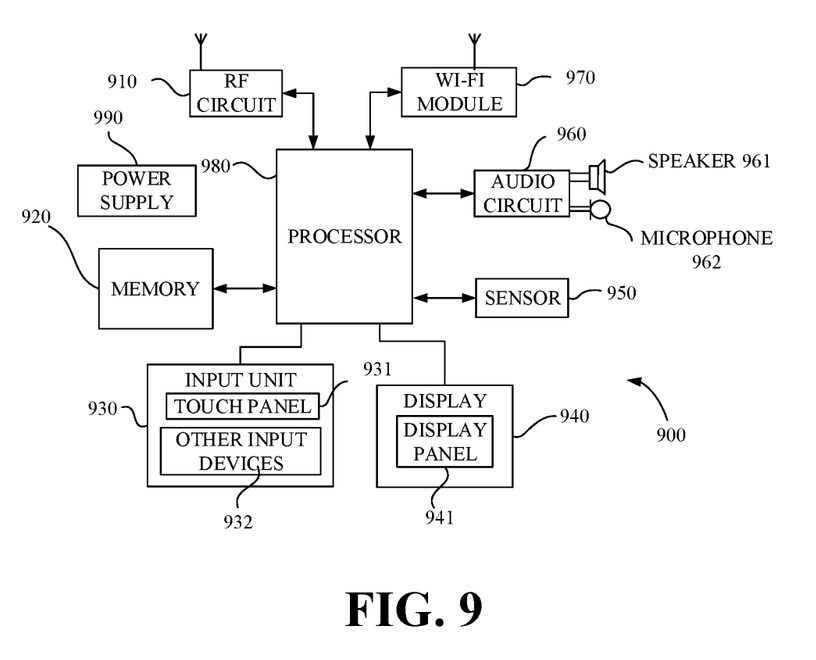
FIG. 9 is a schematic structural diagram illustrating a terminal device according to a fourth implementation of the present disclosure.

The methods of the foregoing implementations can be implemented based on the structure of the terminal device illustrated in FIG. 9.

A computer storage medium is also provided. The computer storage medium is configured to store programs which, when executed, are operable to execute some or all of the steps of any of the methods for data migration as described in the above-described method implementations.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the present disclosure, it should be understood that, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), a disk or a compact disc (CD), and so on.

The implementations of the present disclosure are described in detail above, specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. A method for data migration in a first terminal device, comprising:
   connecting to a hotspot established by a second terminal device;
   receiving, at the first terminal device, a first data set from the second terminal device;
   determining whether a number of threads for data recoveries currently running in parallel is less than or equal to a first threshold;
   performing data recovery on the first data set in one thread in response to determining that the number of threads for data recoveries currently running in parallel is less than or equal to the first threshold; and
   receiving a second data set from the second terminal device and performing data recovery on the second data set in another thread, during data recovery of the first data set.

2. The method of claim 1, wherein performing data recovery on the first data set comprises:
   dividing the first data set into a plurality of data subsets, wherein the first data set has a size greater than or equal to a second threshold; and
   performing data recovery on the plurality of data subsets in one thread in serial.

3. The method of claim 2, wherein for the plurality of data subsets, at least one of the following conditions is satisfied:
   a size difference between adjacent data subsets being a third threshold;
   a size difference between any two of the plurality of data subsets being less than or equal to a fourth threshold; and
   a size difference between adjacent data subsets being a multiple of a fifth threshold.

4. The method of claim 1, further comprising:
   prior to performing data recovery on the second data set:
   determining whether a number of threads for data recoveries currently running in parallel is less than or equal to a first threshold; and
   proceeding to data recovery of the second data set in response to determining that the number of threads for data recoveries currently running in parallel is less than or equal to the first threshold.

5. The method of claim 1, wherein performing data recovery on the second data set comprises:
   dividing the second data set into a plurality of data subsets, wherein the second data set has a size greater than or equal to a second threshold; and
   performing data recovery on the plurality of data subsets in one thread in serial.

6. The method of claim 2, wherein for the plurality of data subsets, at least one of the following conditions is satisfied:
   a size difference between adjacent data subsets being a third threshold;
   a size difference between any two of the plurality of data subsets being less than or equal to a fourth threshold; and
   a size difference between adjacent data subsets being a multiple of a fifth threshold.

7. The method of claim 1, wherein the first data set and the second data set are in one of the following relationships:
   backup of the first data set is completed earlier than backup of the second data set;

a size of the first data set being smaller than that of the second data set; and a usage frequency of an application corresponding to the first data set being higher than that of an application corresponding to the second data set.

8. A method for data migration in a second terminal device, comprising:

establishing a hotspot;

performing data backup on a plurality of applications in the second terminal device in parallel to obtain a plurality of data sets, wherein the plurality data sets are in one-to-one correspondence with the plurality of applications and comprises a first data set and a second data set;

transmitting, from the second terminal device, the first data set to a first terminal device, after the first terminal device is connected to the hotspot; and transmitting the second data set to the first terminal device, after transmission of the first data set is completed.

9. The method of claim 8, further comprising:

determining the plurality of applications.

10. The method of claim 8, further comprising:

receiving from the first terminal device a message specifying the plurality of applications.

11. The method of claim 8, wherein the first data set and the second data set are in one of the following relationships:

backup of the first data set is completed earlier than backup of the second data set;

a size of the first data set being smaller than that of the second data set; and a usage frequency of an application corresponding to the first data set being higher than that of an application corresponding to the second data set.

12. A terminal device, comprising:

at least one processor; and a computer readable storage, coupled to the at least one processor and storing at least one computer executable instruction thereon which, when executed by the at least one processor, causes the at least one processor to carry out actions, comprising:

connecting to a hotspot established by another terminal device;

receiving a first data set from the another terminal device;

determining whether a number of threads for data recoveries currently running in parallel is less than or equal to a first threshold;

performing data recovery on the first data set in one thread in response to determining that the number of threads for data recoveries currently running in parallel is less than or equal to the first threshold; and receiving a second data set from the another terminal device and performing data recovery on the second data set in another thread, during data recovery of the first data set.

13. The terminal device of claim 12, wherein the at least one processor configured to carry out performing data recovery on the first data set is further configured to carry out actions, comprising:

dividing the first data set into a plurality of data subsets, wherein the first data set has a size greater than or equal to a second threshold; and performing data recovery on the plurality of data subsets in one thread in serial.

14. The terminal device of claim 13, wherein for the plurality of data subsets, at least one of the following is satisfied:

a size difference between adjacent data subsets being a third threshold;

a size difference between any two of the plurality of data subsets being less than or equal to a fourth threshold; and a size difference between adjacent data subsets being a multiple of a fifth threshold.

15. The terminal device of claim 12, wherein the at least one processor is further configured to carry out following prior to performing data recovery on the second data set:

determining whether a number of threads for data recoveries currently running in parallel is less than or equal to a first threshold; and proceeding to data recovery on the second data set in response to determining that the number of threads for data recoveries currently running in parallel is less than or equal to the first threshold.

16. The terminal device of claim 12, wherein the at least one processor configured to carry out performing data recovery on the second data set is further configured to carry out actions, comprising:

dividing the second data set into a plurality of data subsets, wherein the second data set has a size greater than or equal to a second threshold; and performing data recovery on the plurality of data subsets in one thread in serial.

17. The terminal device of claim 16, wherein for the plurality of data subsets, at least one of the following conditions is satisfied:

a size difference between adjacent data subsets being a third threshold, a size difference between any two of the plurality of data subsets being less than or equal to a fourth threshold; and a size difference between adjacent data subsets being a multiple of a fifth threshold.

* * * * *

UNITED STATES PATENT AND TRADEMARK OFFICE
CERTIFICATE OF CORRECTION

PATENT NO. : 10,880,728 B2  
APPLICATION NO. : 16/254989  
DATED : December 29, 2020  
INVENTOR(S) : Hailong Zhang Page 1 of 1

It is certified that error appears in the above-identified patent and that said Letters Patent is hereby corrected as shown below:

On the Title Page

(71) Applicant: please delete "Guangdong Oppo Mobile Telecommunications Corp., Ltd.," and insert -- GUANGDONG OPPO MOBILE TELECOMMUNICATIONS CORP., LTD., --

(73) Assignee: please delete "GUANGDONG OPPO MOBILE TELECOMMUNCATIONS CORP., LTD.," and insert -- GUANGDONG OPPO MOBILE TELECOMMUNICATIONS CORP., LTD., --

Signed and Sealed this  
Twenty-third Day of February, 2021

Drew Hirshfeld  
*Performing the Functions and Duties of the*  
*Under Secretary of Commerce for Intellectual Property and*  
*Director of the United States Patent and Trademark Office*